United States Patent [19]

Plunkett

[11] 3,815,102

[45] June 4, 1974

[54] METHOD AND APPARATUS FOR ITEM TRACKING

[75] Inventor: Joseph A. Plunkett, Plano, Tex.

[73] Assignee: Recognition Equipment Incorporated, Irving, Tex.

[22] Filed: Dec. 1, 1972

[21] Appl. No.: 311,092

[52] U.S. Cl. .............................................. 340/172.5
[51] Int. Cl. .............................................. B65h 43/00
[58] Field of Search .................. 340/172.5; 235/61.6

[56] References Cited

UNITED STATES PATENTS

| | | | |
|---|---|---|---|
| 2,962,211 | 11/1960 | Ghertman et al. | 340/172.5 |
| 3,238,356 | 3/1966 | Dowds et al. | 340/172.5 |
| 3,397,392 | 8/1968 | Henig et al. | 340/172.5 |

*Primary Examiner*—Gareth D. Shaw
*Attorney, Agent, or Firm*—Richards, Harris & Medlock

[57] ABSTRACT

Documents are fed into a transport system wherein the leading and trailing edges thereof are detected by an item presence detector. As the document travels through the transport system various control stations are passed at which an operation is selectively performed on the document. After passing the various control stations, a document is deposited in one of a plurality of stacker pockets. A document is tracked through the transport system by means of tracking logic responsive to the leading and trailing edge signals generated by the item presence detector. These signals are stored in a document directory and an item code which is periodically incremented to reflect movement of the document through the transport system. Each item code stored in the document directory is sequentially compared with a location code of the various control stations and one of the stacker pockets as stored in a transport directory. When a comparison occurs between an item code stored in the document directory and one of the station location codes in the transport directory, one of the control stations is activated to perform a function on the moving document or one of the stacker pockets is opened. As a document moves into the transport system an initial determination is made of the document's mechanical configuration to determine if it meets certain selected initial conditions. When a fault is detected in the mechanical configuration of a particular document, a fault code is stored in the document directory and this code causes the document to be rejected into a reject stacker pocket in the transport system. For purposes of checking the transport system and the tracking logic, a document is simulated for comparison with the station location codes and the pocket codes in the transport directory.

30 Claims, 12 Drawing Figures

METHOD AND APPARATUS FOR ITEM TRACKING

This invention relates to a sequential system control, and more particularly to sequential control of a system having a plurality of channels each with a known time displacement therebetween.

Previous techniques employed for tracking documents along a transport employed electronic devices such as shift registers or magnetic memory drums. The memory drums were the original devices and as electronic technology advanced, the shift register technique became more practical because of cost consideration and size advantages of integrated circuits. With either of these tracking techniques, however, changes had to be incorporated into the wiring and the number of components employed whenever the length of the transport was changed or as optional devices, such as recording cameras, were added along the transport path. This resulted in extra manufacturing documentation for the electronics as well as changes in logic schematics and theory of operation for each configuration.

A feature of the present invention is to provide item tracking along a transport whereby the location of the item is maintained by storing a code in a random access memory, identified as a document directory. Each item being tracked will have a unique word assigned thereto at one address location in the document directory. Another feature of the present invention is to provide a method and apparatus for item tracking wherein a transport system having a large number of control points in a multitude of configurations has greater flexibility as to future additions. Still another feature of the present invention is to provide a transport system having tracking logic that lends itself readily to a diagnostic check.

Although the invention will be described with reference to a document transport and document tracking, it may also be utilized in applications involving items processed through a cycle with a uniform displacement relationship throughout. For example, boxes on a conveyor belt may be tracked to the various unloading stations, if all points along the belt system have a known displacement versus time relationship. Another example is a sequential programmer wherein a number of discrete channels are provided so that in a given cycle (expressed in time or physical displacement) each channel is exercised through a desired on/off sequence.

With reference to a document transport, as each document enters the transport system its leading and trailing edges are measured with respect to an item presence detector as part of the transport. Signals from the item presence detector are converted into an item code stored in a document directory. This code, defining the leading and trailing edges of a document, is incremented for each incremental change in position of the document in the transport, as determined by clock pulses synchronized with the movement of the transport. Control locations along the transport at which documents may be processed are assigned an identifying code and these codes are stored in a read only memory, called the transport directory. Each address of the read only memory has a particular control location code with the order of the stored codes corresponding to the order of the locations along the transport system. Thus, the contents of a particular word in the transport directory will be coded information reflecting the distance of the respective processing point from the item presence detector.

To determine if a document is at a processing point along the transport, the code relating thereto in the document directory is compared with the control location code in the transport directory. If a comparison occurs, the appropriate station controller is energized to perform a particular function, if desired. The comparison cycle occurs with each incremental change in document position as evidenced by updating the item code in the document directory.

In accordance with one embodiment of the invention, a system of a plurality of channels having a known time displacement therebetween is sequentially controlled by initially generating for each control item entering the system a code representing the starting time of the item in the system. The code for each item is stored at one address of a read/write memory. In addition, an identifying code for each of the plurality of channels of the system is stored in a memory at an address corresponding to the displacement of individual channels in the system. Each item code is sequentially compared with all the identifying codes and in response to a predetermined relationship upon such comparison, one of the plurality of system channels is controlled.

A more complete understanding of the invention and its advantages will be apparent from the following specification and claims and from the accompanying drawings illustrative of the invention.

Referring to the drawings.

Figure 1:
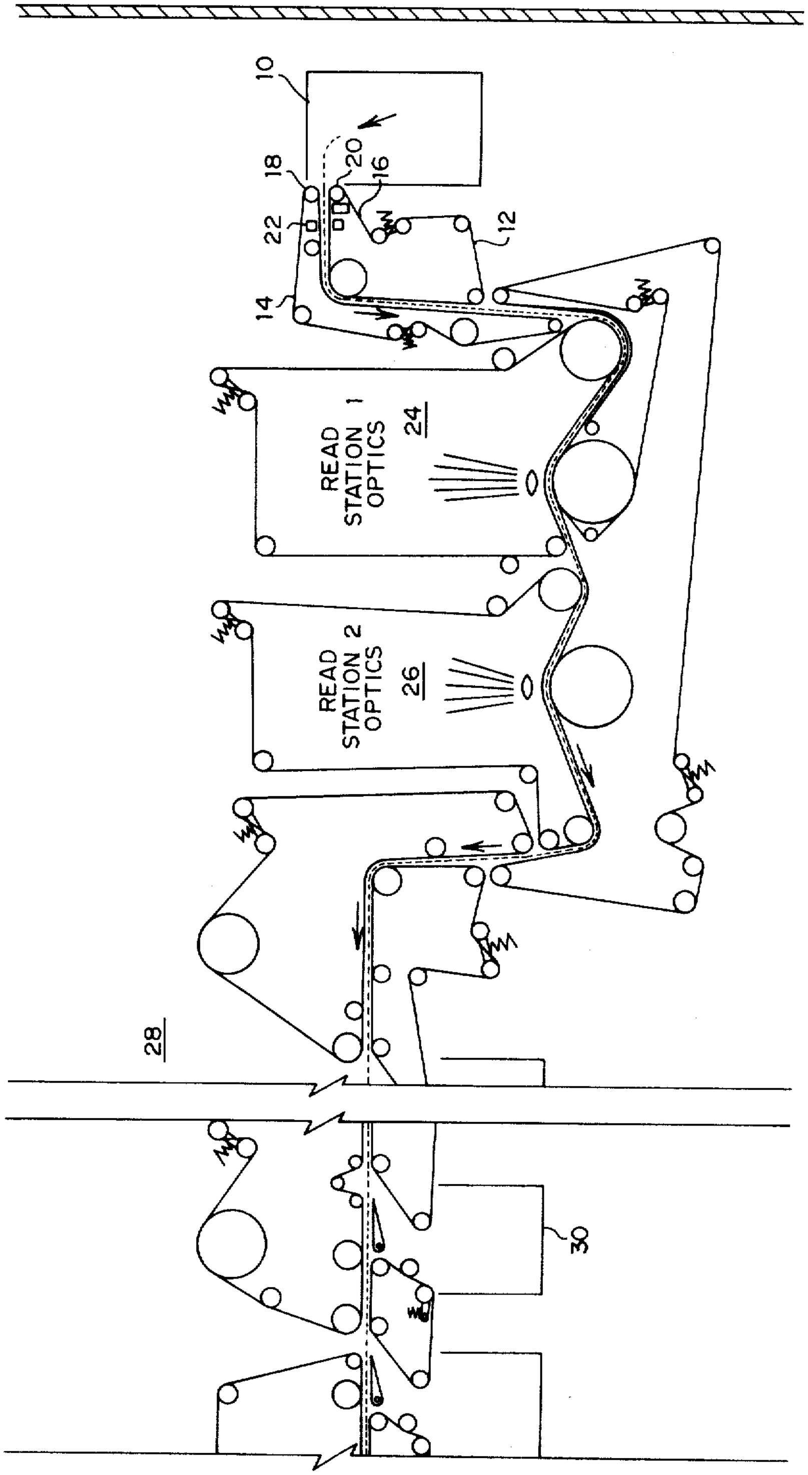
FIG. 1 is a schematic of a document belt transport including two optical character read stations and a plurality of stacker pockets.

Referring to FIG. 1, a document from a feed tray 10 is fed into a transportation system including two belts 12 and 14 at the entrance area to the system. Immediately upon entering the feed belts 12 and 14, a document passes an item presence detector 16. At the item presence detector 16, leading and trailing transitions of a document are detected by a photocell assembly containing a vertical array of three sensors located approximately 3.5 inches from feeder pinch rollers 18 and 20. The item presence detector 16 is composed of three lamps, three photocells, and an amplifier OR circuit. When any one of the light paths to the photocell is blocked, the presence of a document is indicated. A signal from the item presence detector 16 is used in document tracking logic, as will be explained, to monitor the leading and trailing edge of a document.

After passing the item presence detector 16, a document passes a multi-item detector 22 located downstream of the item presence detector and before the first character read station 24. The multi-item detector 22 senses when more than one document is moving through the transport system at a single location.

Following the character read station 24, the system of FIG. 1 includes a character read station 26 followed by an optional module in an area identified by reference numeral 28. The optional module may contain one or more additional control stations such as a microfilm recorder and/or a document endorser. Following the optional module, the system comprises a plurality of stacker pockets, such as pocket 30, into which documents fed from the tray 10 are deposited in accordance with indicia thereon.

In a typical stacker pocket system, the first pocket in the chain is a reject pocket into which all documents not satisfying an established mechanical configuration are deposited. Next in the stacker chain in a pocket where all documents which have not been correctly read and deposited for future feeding through the system.

As a document moves through the transport system past the various control locations and into one of the stacker pockets, control of the various stations for a particular document is essential. For example, one set of documents may require reading at both the read stations 24 and 26 prior to being deposited into one of the stacker pockets. As each of the documents enters the various read stations, these stations must be activated to be ready for the approaching document.

Figure 2:
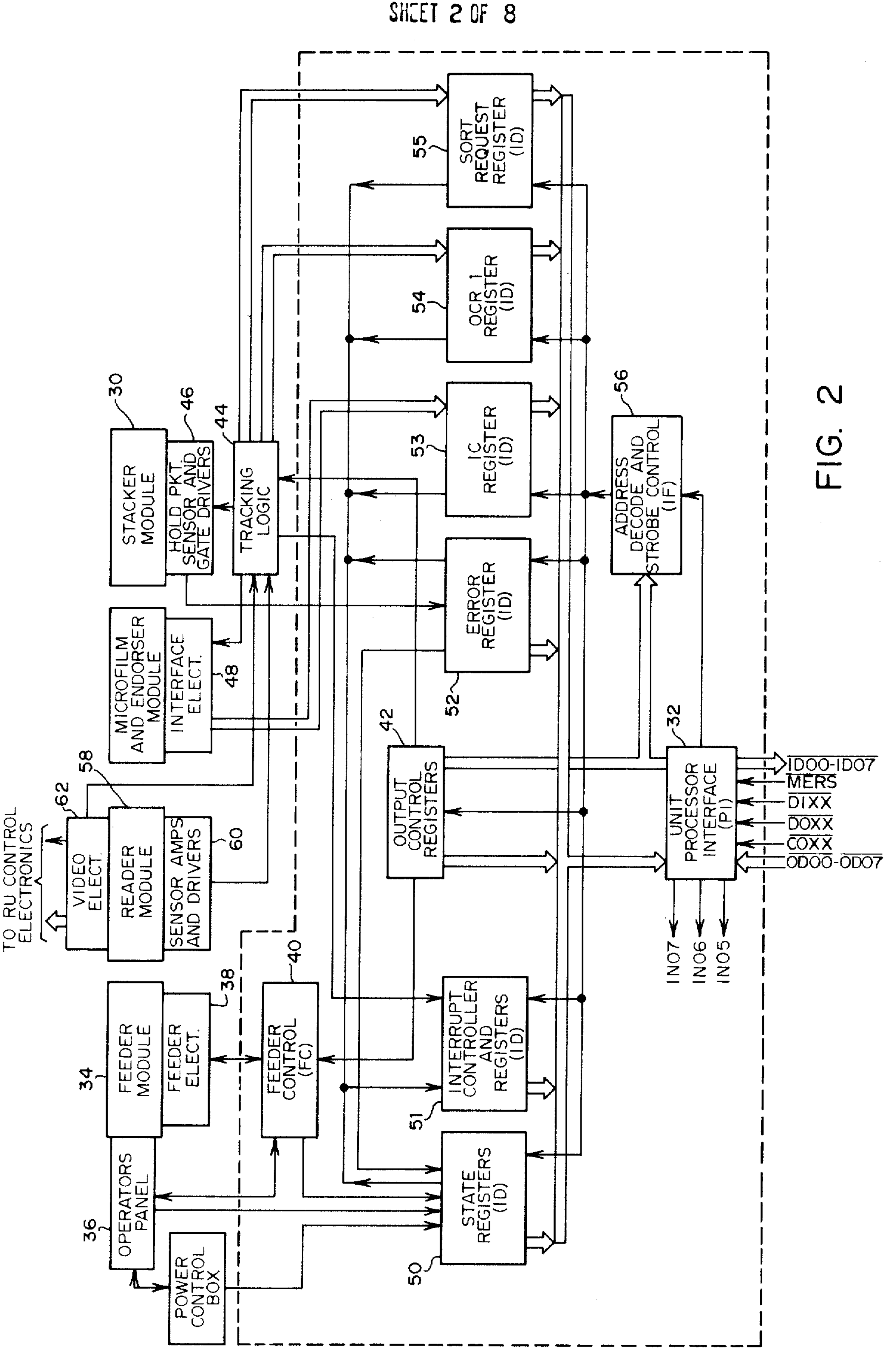
FIG. 2 is a block diagram of a transport control system for controlling the movement of documents through the belt transport of FIG. 1.

Referring to FIG. 2, there is shown a block diagram of controls for a transport system wherein a unit processor interface module 32 feeds signals to and receives instructions from a unit processor, that is, a properly programmed central computer (not shown). A feeder control module 34 controls the operation of the feed tray 10 in accordance with operator instructions manually set on an operator's panel 36. Controlling the feeder module 34 is electronic circuitry 38. The electronic circuitry 38 receives control instructions from a feeder control module 40. In turn, the feeder control module 40 operates in accordance 42 receiving and sending data to the unit processor through the interface module 32.

Also coupled to the output registers 42 is a tracking logic module 44 that maintains the position of each document in the transport system by periodically incrementing an identifying code in a document directory. Under control of the tracking logic 44 is each of the stacker pockets 30 by means of gate drivers within a module 46. Where included within the system, the microfilm recorder and document endorser are also controlled by the tracking logic 44 through an interface electronics module 48.

To provide the unit processor with the data required for operation of the transport system, a series of registers 50–55 have data lines coupling to the interface module 32. Each of these registers is under the control of address decode and strobe control module 56 receiving data and control instructions through the interface module 32. The state register 50 provides data to the unit processor for control of the error operations and document feeding, the latter in accordance with signals from the operator's module 36. The interrupt controller register 51 provides data for interrupting the operation of the transport operating modes for any of selected malfunctions.

Whenever an error is detected in the system, such as multi-documents passing through the transport system, the error register 52 provides data to the unit processor to generate instructions to the control registers 42. The IC register 53 provides data from the optional module on the operation thereof. Similarly, the OCR register 54 provides data to the unit processor from the tracking logic 44 covering the operation of the character read stations 24 and 26. Finally, the sort request register 55 provides data to the processor for controlling the various stacker pockets.

Also part of the control for the transport system is a reader module 58 including sensor and driver amplifiers 60 and video electronics 62 for the character rear stations 24 and 26. Video electronics 62 provide data and control signals to a character recognition unit, preferably of the type employing an electronic retina.

Figure 3:
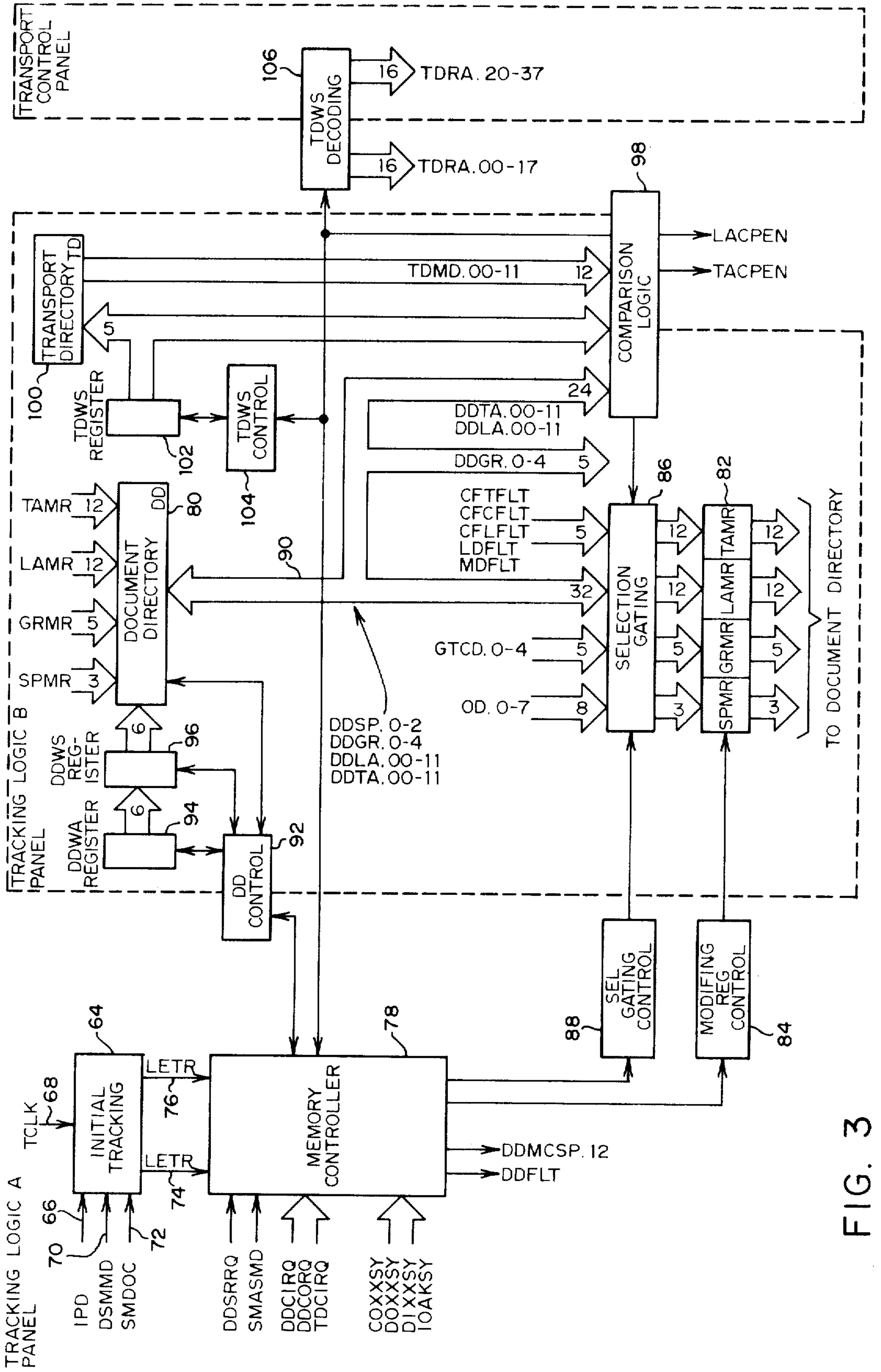
FIG. 3 is a block diagram of document tracking logic in accordance with the present invention as utilized in the transport control of FIG. 2.

Referring to FIG. 3, there is shown a block diagram of the document tracking logic 44 which is the control part of the tracking system. Within the tracking logic 44 there is maintained the location of all the documents in the transport at any given time. Each document is tracked through the transport system by maintaining a record of its leading and trailing edge locations with respect to the item presence detector 16.

For each incremental movement of the belts in the transport system, the leading and trailing edges of all documents being tracked are compared with control points along the transport system. When a comparison occurs, a control action is either initiated or terminated. After the comparison cycle for each document is completed its leading and trailing edge locations are updated to reflect the incremental movement through the transport system. As an example of such incremental movement, the leading and trailing edge data is updated for each 0.1 inch of belt movement.

Within the tracking logic 44 there is initial tracking logic 64 receiving the leading and trailing edge transition signals for the item presence detector 16 on a line 66 and clocked data on a line 68. The clock data on the line 68 provides the instructions for the incremental updating of the leading and trailing edge data. Also coupled to the initial tracking logic 64 is a document simulation mode (DSMMD) instruction on a line 70 and simulated document (SMDOC) data on a line 72.

The initial tracking logic 64 is used to track a document for the first 0.6 inch of travel in the transport beyond the item presence detector 16. Its primary function is to mask holes in the document less than 0.3 inch in width so that the logic will not mistake the edge of a hole for a document edge. When either the leading or trailing edge of a document is 0.6 inch beyond the detector 16, the leading edge transition (LETR) signal of a trailing edge transition (TETR) signal is developed on lines 74 or 76, respectively. The LETR signal notifies a memory controller 78 to store the leading edge data in a document directory 80. The TETR signal notifies the memory controller 78 to store the trailing edge data in the document directory 80. Either the signal from the detector 16 on line 66 or the simulated document (SMDOC) signal on line 72 from the document simulation logic, to be explained, is used to represent a document in the transport. The former represents a normal document and the latter represents a simulated document in the document simulation mode from an instruction on line 70.

The memory controller 78 consists of logic for controlling the timing of all operations involving the document tracking logic 44. There are seven modes of operation of the document tracking logic, these are:

1. Initialization Mode
2. Initial Assignment Mode
3. Document Directory Memory Comparison Mode
4. Document Directory Concurrent Output Mode
5. Document Directory Concurrent Input Mode
6. Transport Directory Concurrent Input Mode
7. Idle Mode Signals relating to the leading and trailing edge of a document passing the detector 16 are not directly inputed to the document directory 80. Instead, data is generated in modifying register logic 82 under the control of a modifying register controller 84 receiving instructions from the memory controller 78. The modifying register controller 84 provides for the generation of the various control signals associated with the modifying register logic 82. These signals are a function of the various states of the memory controller 78.

The modifying register 82 consists of four registers: a supervisory data modifying register (SPMR), a gate code/mechanical reject modifying register (GRMR), a leading edge modifying register (LAMR) and a trailing edge modifying register (TAMR).

Three bits of each word at an address in the document directory 80 are allocated for supervisory data in the supervisory register of the logic 82. The second bit in the supervisory register, referred to as the document assignment bit, indicates whether the work address is being used to track a document or not. A logic ONE indicates the word is assigned to a document. The first bit in the supervisory register, referred to as the transport directory reference bit, indicates the section of the transport in which the document is located. A logic ZERO indicates the trailing edge of the document has not reached the lead point for the first gate of the first stacker pockets, i.e., the document is in the first half of the transport system. A logic ONE indicates the trailing edge of a document is beyond the lead point for the gate of the first stacker pocket and the document is in the second half of the transport. This bit is used in the comparison step to select either the first or second half of the list of control processing location codes. In the supervisory register, the ZERO bit position is not used.

Five bits of each assigned word for a particular document in the document directory 80 are timed shared as a document moves down the transport. These five bits in the gate code/mechanical register represent either the mechanical rejects of the document or the gate code of the pocket into which it is to be stacked. The five bits reflect the mechanical reject status of a document from the time the trailing edge thereof is at a fault detection station number ONE until its leading edge is at the gate assignment station. At the gate assignment station, the gate code/mechanical reject register stores and carries a gate code so long as the document is tracked.

In the gate code/mechanical reject register, the five bits thereof represent the mechanical reject status of a document as follows: the fourth bit in the register represents a close feed trail fault (CFTFLT), the third bit represents a close feed chain fault (CFCFLT), the second bit represents as a close feed lead fault (CFLFLT), the first bit represents a long document fault (LDFLT) and the zero bit position represents a multidocument fault (MDFLT).

In the leading edge modifying register there are twelve bit positions representing in total the binary position of the leading edge of a document in the transport system with respect to the item presence detector 16. For the trailing address modifying register there are also twelve bits assigned to represent the binary position of the trailing edge of a document in the transport system, again with respect to the item presence detector 16.

Data into the modifying register logic 82 is transmitted through selection gating logic 86 that provides for the selection of mechanical reject/gate code data, supervisory data, and leading and trailing address data. The selection gating logic is controlled by SEL gating control logic 88. The selection gating control 88 comprises logic for controlling selection of data for input into the modifying register logic. The gating control signals for the control 88 initiate from the memory controller 78 and are a function of the various states of the memory controller and the location of the tracked document in the transport system.

Data for selection for transferring into the modifying register 82 through the selection gating logic 86 originates in various areas of the system. Eight bits (OD.0–7) originate in the unit processor and are output dated therefrom. Five bits inputed to the selection gating logic are the gate controls and are identified by the mnemonic in CTCD.0–4. In the normal tracking operation, 32 bits are transmitted through the selection gating logic 86 from the document directory 80 into the modifying register 82. Three of these bits are the document directory supervisory data (DDSD.0–2), five bits are the gate code or reject data (DDGR.0–4), twelve bits are the leading edge data (DDLA.00–11), and twelve bits are the trailing edge data (DDTA.00–11). This data is transmitted to the selection gating logic 86 from the document directory 80 over the channel 90. In the diagnostic mode, eight bits of data from the unit processor are selected for input into the modifying register. The unit processor outputs four eight bit words for each document directory word. The selection gating control loads these four bytes of information into the modifying register to be written into the document directory. The fault conditions for mechanically rejecting a document from the transport system are loaded into the GRMR portion of the modifying register when the document status has been determined.

The position of a document 0.6 inch into the transport system is stored into the document directory 80 and identified with a leading edge code and a trailing edge code. Assignment of the leading edge and trailing edge codes to a particular address in the document directory 80 is under the control of document directory control logic 92. The document directory control logic 92 receives and transmits instructions to the memory controller 78. It also provides the various control signals associated with a document directory word assignment register 94 and a document directory word select register 96. In addition, the document directory 80 also receives control instructions from the document directory control logic 92.

To address the document directory 80 is a function of the document directory word select register 96. The register 96 selects the word being read from or being written into the document directory. For the selection of a particular address for a new document entering the transport system, the document directory word assignment register 94 is utilized. This register controls the assignment of words in the document directory 80 to documents as they enter the transport system. Both the registers 94 and 96 provide six bits of data.

Each assigned word in the document directory identifies the position of a document in the transport system. For each one-tenth of an inch of travel of the transport system, the data for each document in the document directory is sequential gated into the modified register logic 82 where both the leading edge data and the trailing edge data are incremented to represent the new position of the document. The incremented data in the modifying register 82 is then returned to the document directory 80.

It is this updated data that is transferred to comparison logic 98 for comparison with a directory of codes representing processing control locations along the transport system. This directory of processing control location codes is stored in a transport directory 100 having one address for each of the control points along the transport system. Thus, the function of the transport directory logic 100 is to provide the storage of all points of interest along the transport system.

The transport directory 100 is read only memory and in a representative system in configured to have 32 words each containing sixteen bits. In a typical system, however, only the 12 least significat bits in each word are required for storing the control location codes. The data stored in the word codes represents the distance in tenths of an inch from the control point identified by a particular word to the item presence detector 16.

In a typical system along the lines as illustrated in FIG. 1, the assignment of control points along the transport system to a word address in the transport directory 100 is presented in Table I. If a particular system configuration does not contain a control point, no data will be present in the associated address of the transport directory 100. Thus, regardless of the transport configuration a particular control point will always be associated with the same transport directory word.

TABLE I

| Octal Address | Directory Assignment |
|---|---|
| 00 | Fault Detector Station 1 |
| 01 | Fault Detector Station 2 |
| 02 | MICR Station |
| 03 | OCT No. 1 Station — 0.3 inch |
| 04 | OCR No. 2 Station — 0.3 inch |
| 05 | (SPARE) |
| 06 | Endorser Lead |
| 07 | IC Request Station |
| 10 | IC Lead Station — 0.1 inch |
| 11 | IC Frame Station |
| 12 | (SPARE) |
| 13 | Sort Request Station |
| 14 | Gate Assign Station |
| 15 | Stacker Gate No. R Lead |
| 16 | Stacker Gate No. X Lead |
| 17 | Stacker Gate No. 0 Lead |
| 20 | Stacker Gate No. 1 Lead |
| 21 | Stacker Gate No. 2 Lead |
| 22 | Stacker Gate No. 3 Lead |
| 23 | Stacker Gate No. 4 Lead |
| 24 | Stacker Gate No. 5 Lead |
| 25 | Stacker Gate No. 6 Lead |
| 26 | Stacker Gate No. 7 Lead |
| 27 | Stacker Gate No. 8 Lead |
| 30 | Stacker Gate No. 9 Lead |
| 31 | Stacker Gate No. 10 Lead |
| 32 | Stacker Gate No. 11 Lead |
| 33 | Stacker Gate No. 12 Lead |
| 34 | Stacker Gate No. 13 Lead |
| 35 | Stacker Gate No. 14 Lead |
| 36 | Stacker Gate No. 15 Lead |
| 37 | Last Gate Lead Address + 10 inches |

An important feature of the present invention is the ability to expand the tracking logic 44 to a particular configuration of transport system without rewiring and system engineering. To accomplish this feature, the tracking logic is expanded and modified by varying the transport directory logic 100 to include more or less control points. By utilizing a sixteen bit read only memory, considerable expansion of the system from that shown in Table I is possible.

The directory of words in the transport directory logic 100 is addressed from a transport directory word select register 102 under the control of transport directory word select logic 104. The word select logic 104 provides for the generation of the various control signals associated with the transport word select register 102. The word select register 102 is a five bit register that is used to address a particular word of the transport directory for readout to the comparison logic 98.

As mentioned, for each one-tenth of an inch of travel of the belt transport each word in the document directory 80 is compared with all of the processing location control words in the transport directory 100. This comparison is completed in the comparison logic 98, that includes two parallel registers receiving data from the directory 100. One register is for the comparison of the leading edge code with the processing location code and the second register is for the trailing edge comparison. The comparison logic 98 provides for generation of leading edge and trailing edge compare signals at all points in the transport directory 100 as a document moves through the transport system. These signals are used by the various station controllers, e.g. the character reader stations 24 and 26, for initiating and terminating, as appropriate, control actions. In the processor simulation mode, referred to previously, it provides to the unit processor an indication of whether a leading edge or a trailing edge comparison occurred and at which location in the transport directory 100.

When a comparison occurs between a particular document position code and a processing location code, either leading or trailing edge, the code is detected for utilization in control of the station. This decoding is completed in a transport directory word select decoding register 106 as the last logic block of the tracking logic 44. The decoding in the word select register 106 is completed only when the tracking logic is in the document directory memory comparison (SSMC) mode, as will be explained. This is accomplished through the use of one of two shift registers. A particular shift register is selected at the time a word is read from the document directory. The selection is controlled by the transport directory supervisory bits in the supervisory register (SPMR). Only one of the processing location control words will be true in the DDMC mode. It will reflect the word in the transport directory 100 that is being compared with the leading and trailing edges of a document position code.

Figure 4:
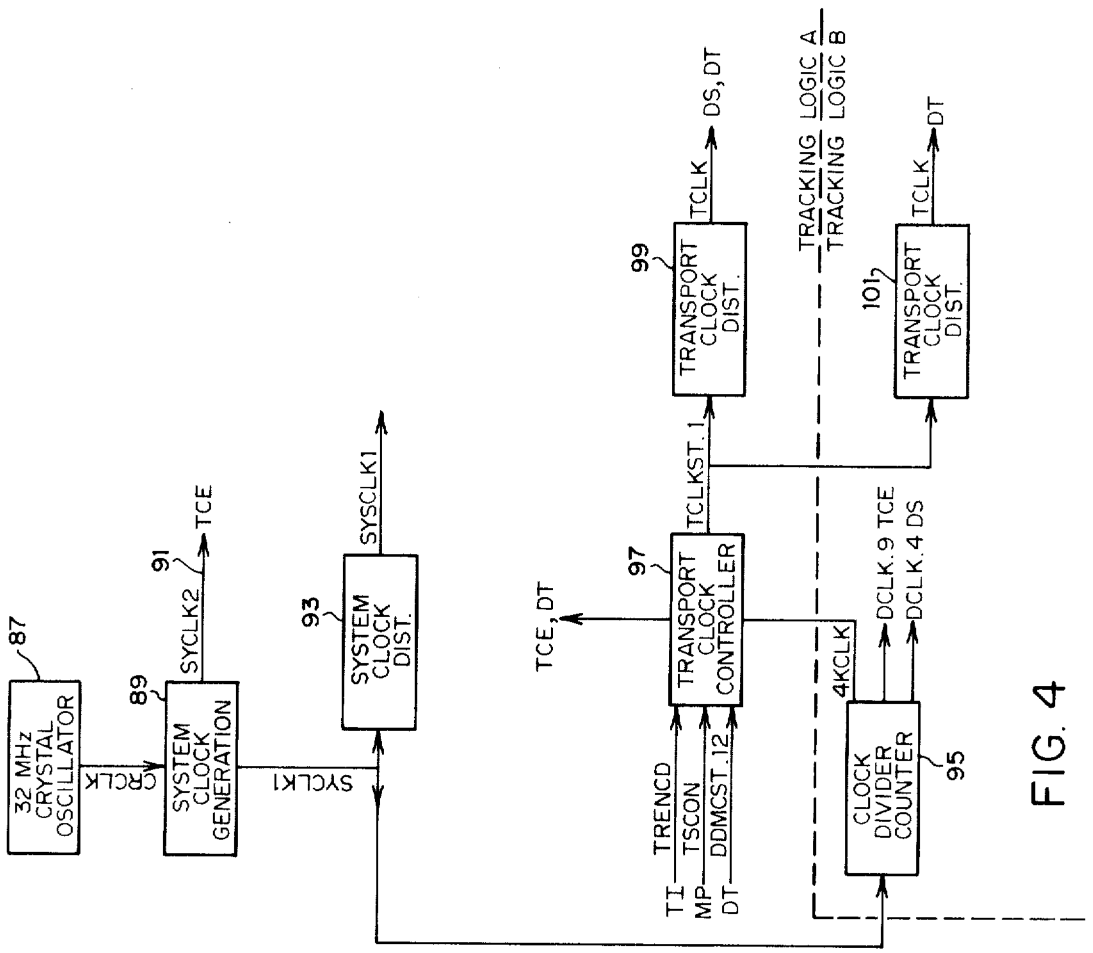
FIG. 4 is a block diagram of a timing system for generating clock pulses to the tracking logic.

Referring to FIG. 4, there is shown a block diagram of a timing control utilizing as a reference source a crystal oscillator 87 developing a fixed pulse rate to a system clock network 89. The basic function of this logic is to develop three clock signals; system clock 1 (SYCLK1), system clock 2 (SYCLK2) and a transport clock (TCLK). The network 89 generates two pulse trains, one on a line 91 to the transport control electronics (FIG. 2) to synchronize operation of the transport movements with the timing pulse. Also generated by the network 89 is a system clock pulse applied to a distribution circuit 93 and a clock divider counter 95. An output from the clock divider 95 is applied to a transport clock controller 97 generating a series of clock pulses to a transport distributing network 99 and a transport distributing network 101. An output from the distribution networks 99 and 101 are coupled to the tracking logic 44 and in particular to the initial tracking logic 64 with the output of the network 99 coupled to the line 68.

There are seven modes of operation of the document tracking logic. The first of these modes is the initialization mode which provides for the initializing of the document tracking logic prior to the tracking of any documents to the transport system. In this mode, each word address in the document directory 80 is cleared. Also, the document directory word assignment register 94 and document directory word select register 96 are also cleared. This mode is entered from the idler mode of the tracking logic on an initialization request.

Figure 5:
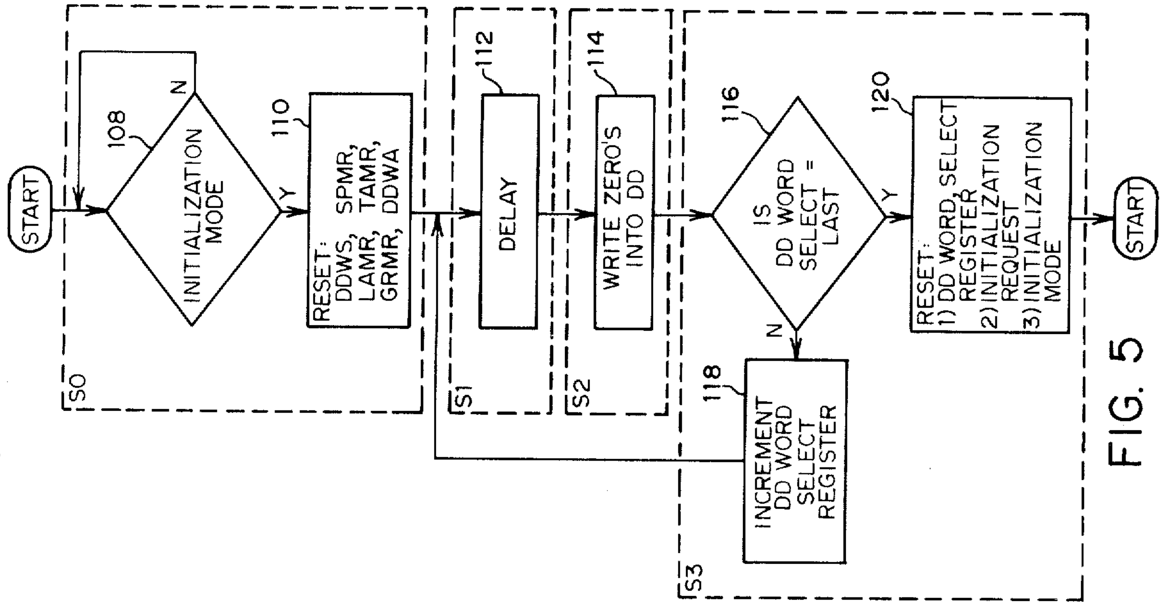
FIG. 5 is a flow chart illustrating the operation of the tracking logic of FIG. 3 in an initialization mode.

Referring to FIG. 5, there is shown a flow diagram of the initialization mode. With the tracking logic 44 in the initialization mode, an inquiry 108 is made to determine if the controller is in this mode. A positive response to the inquiry 108 advances the initialization mode to complete a reset step 110. In the reset step 110, the document directory word select register 96 and the document directory word assignment register 94 are cleared, as mentioned previously. In addition, the supervisory modifying register, the leading address modifying register, the trailing address modifying register and the gate/reject register of the modifying logic 82 are all cleared to zero. Following the step 110, the system proceeds through a delay 112 to enable the various logic components to settle into a steady state condition. After the delay 112, the sequence advances to a write step 114 wherein zeros are written into each address of the document directory 80. This function is completed for each address on an individual basis. Following the writing of zeros at each document directory address, the sequence is then advanced to inquiry 116. Inquiry 116 determines whether all of the addresses of the document directory 80 have been rewritten with zeros. A negative response to the inquiry 116 advances the sequence to an increment step 118 wherein the document directory word select register 96 is incremented to the next directory address. This returns the sequence to the delay 112 and then through the write step 114 to the inquiry 116. This loop continues for each address of the document directory 80. When the last address of the document directory has been rewritten with zeros a response to inquiry 116 will be positive and the initialization mode sequence advances the reset step 120. In the step 120, the document directory word select register 96 is reset ready to accept an initialization request or an initialization mode request. The tracking logic is then ready to advance to the initial assignment mode.

The initial assignment mode is entered immediately following a request to service the document directory 80 unless an inhibit condition exists. The document directory 80 is serviced by developing a signal on the trailing edge of a transport clock pulse on the line 68 and remains true until the completion of the document directory memory comparison mode.

Figure 6:
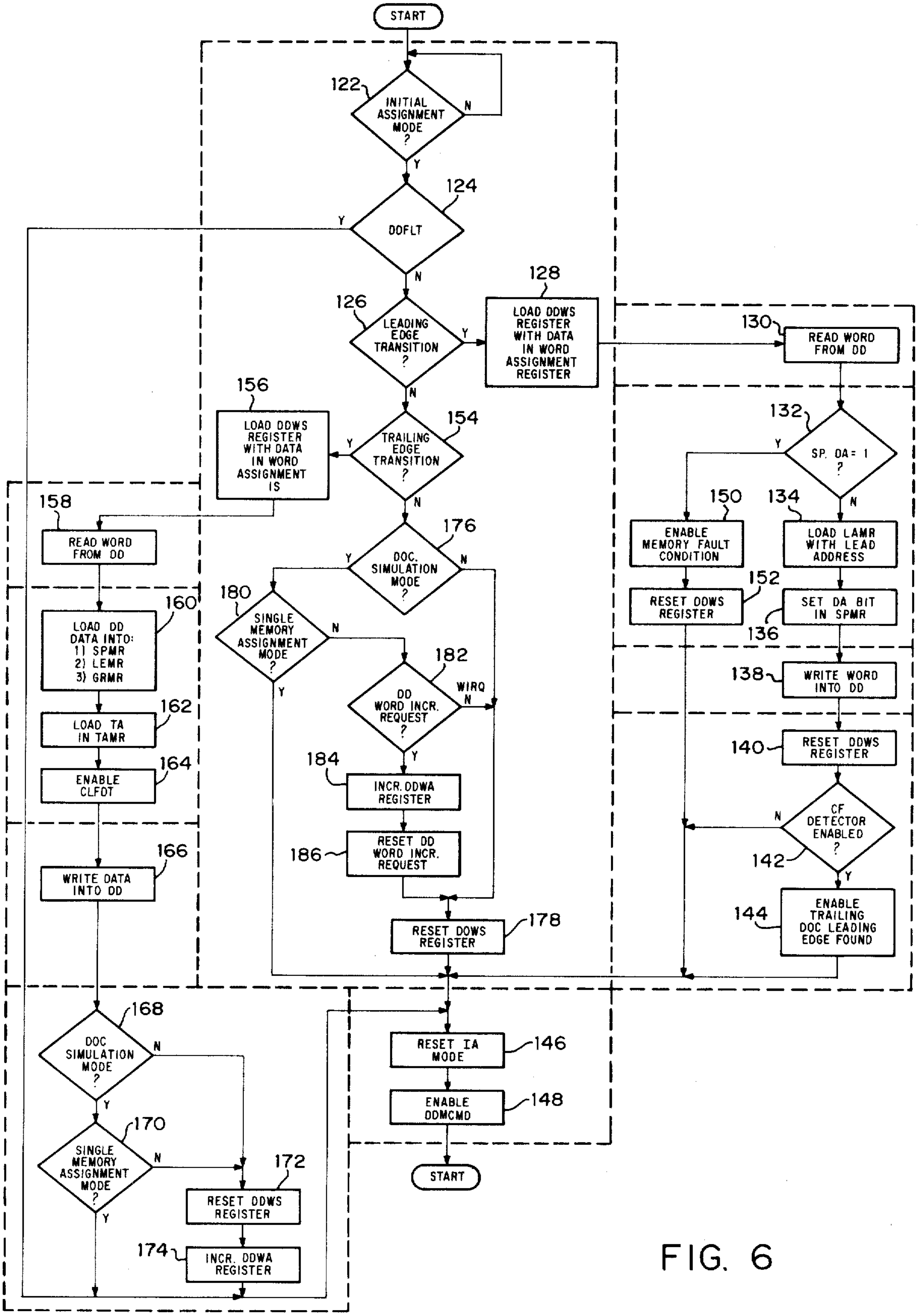
FIG. 6 is a flow chart illustrating the operation of the tracking logic in an initial assignment mode.

Referring to FIG. 6, there is shown a flow chart of the initial assignment mode wherein the first inquiry 122 determines whether the request by the controller 78 is for the initial assignment mode. Following a positive response to the inquiry 122, indicating that the tracking logic is in the initial assignment mode, the sequence advances to a document directory fault inquiry 124. A positive response to inquiry 124 will be explained later and a negative response advances the sequence to an inquiry 126. If inquiry 126 determines that the assignment mode is for a leading edge transition, then the sequence advances to step 128 wherein the document directory word select register 96 is loaded with data in the word assignment register 94.

Following the loading of data into the register 96, the sequence advances to a read step 130 wherein data is read from a particular address of the document directory 80. If the supervisory data at the particular address loaded from the register 94 signifies that the address is available, as determined by inquiry 132, the sequence advances to a load step 134 wherein the lead address modifying register of the logic 82 is loaded with a lead address data. Following loading of the lead address modifying register with data the address of the document directory is no longer available and the second bit position (bit three) of the supervisory modifying register is set to logic ONE in a step 136.

After completing the step 136, the word in the leading address modifying register is written into the document directory 80, at the selected address, in a rite step 138. Next, the sequence advances to a reset step 140 wherein the document directory word select register 96 is reset. The sequence then advances to an inquiry 142 where a determination is made if the close feed detector has been enabled (to be explained). The routine then advances to a reset step 146 and the tracking logic 44 is reset to the initial assignment mode. Upon resetting the initial assignment mode, the sequence advances to a step 148 for enabling the document directory memory comparison mode.

Returning to inquiry 132, a positive response to this inquiry indicates that the address in the document directory from the register 94 has been previously assigned and the sequence advances to a step 150. During step 150, a memory fault condition is enabled and the system advances to a reset step 152 wherein the document directory word select register 96 is reset and the system advances to the reset initialization assignment mode 146.

A negative response to the inquiry 126, indicating that the initial assignment mode was not activated by a leading edge transition, advances the sequence from inquiry 126 to an inquiry 154 wherein the determination is made if the request to activate the initial assignment mode was as a result of trailing edge transition. A positive response to the inquiry 154 advances the routine to a load step 156 wherein data in the word assignment register 94 is loaded into the document directory word select register 96. Next, the sequence advances to a step 158 wherein the word address in the document directory 80 is read and the sequence advances to load this data into the modifying register logic 82.

At this time, data is loaded into the supervisory modifying register, the leading address modifying register and the gate/reject modifying register. The sequence advances to the load step 160 only under the condition where there has been no previous assignment to the trailing edge modifying register and therefore that data is zero. Next, the sequence advances to step 162 wherein a document trailing address is loaded into the trailing edge modifying register.

Upon completion of the step 162, the sequence advances to an enable step 164 wherein the close feed detector is enabled. Following enabling of the close feed detector in step 164, the sequence advances to a write step 166 wherein data in the modifying register 82 is written into the document directory at the address in the register 94. Next, the assignment mode advances to an inquiry 168, and unless the initialization mode has been entered for the purpose of document simulation, the sequence advances to an inquiry 170 where a determination is made of whether the assignment mode is for a single memory entry. A positive response to the inquiry 170 advances the sequence to the reset initialization assignment mode step 146.

A negative response to the inquiry 170 advances the sequence to a reset step 172 wherein the document directory word selector register 96 is reset and the sequence advances to an incrementing step 174. In the step 174, the document directory word assignment register is incremented to the next address of the document directory 80. Complementing the step 174 advances the sequence to step 146.

If the assignment mode has been entered for the purposes of document simulation, both the inquiries 126 and 154 produce negative responses and the sequence advances to an inquiry 176. A negative response to the inquiry 176 advances the sequence to a reset step 178 wherein the document directory word select register 96 is reset and the sequence advances to the reset initialization assignment mode step 146.

A positive response to the inquiry 176 advances the routine to an inquiry 180 wherein a positive response advances the sequence again to step 146 and a negative response advances the sequence to inquiry 182.

The inquiry 182 is a document directory word increment request and a positive response advances the routine to a step 184 wherein the word assignment register 94 is incremented. Next, the sequence advances to step 186 wherein the document directory word increment request is reset.

Completing the step 186 advances the sequence to the reset step 178, as has been explained. Following the step 178, the sequence proceeds through the steps 146 and 148 to enable the document directory memory comparison mode.

The document directory memory comparison mode immediately follows the initial assignment mode. In this mode each word address in the document directory 80 is read and the word representing the position of the leading and trailing edges of a document in the transport system is compared in sequential steps with one-half of the words in the transport directory 100. That half of the directory 100 to be considered is determined by the data in the supervisory memory register. After the comparison cycle with the transport directory 100, the leading and trailing edge data is incremented as required to update the position of a document in the transport system and returned to the document directory 80. The word select register 96 is incremented until the last word is serviced.

Figure 7:
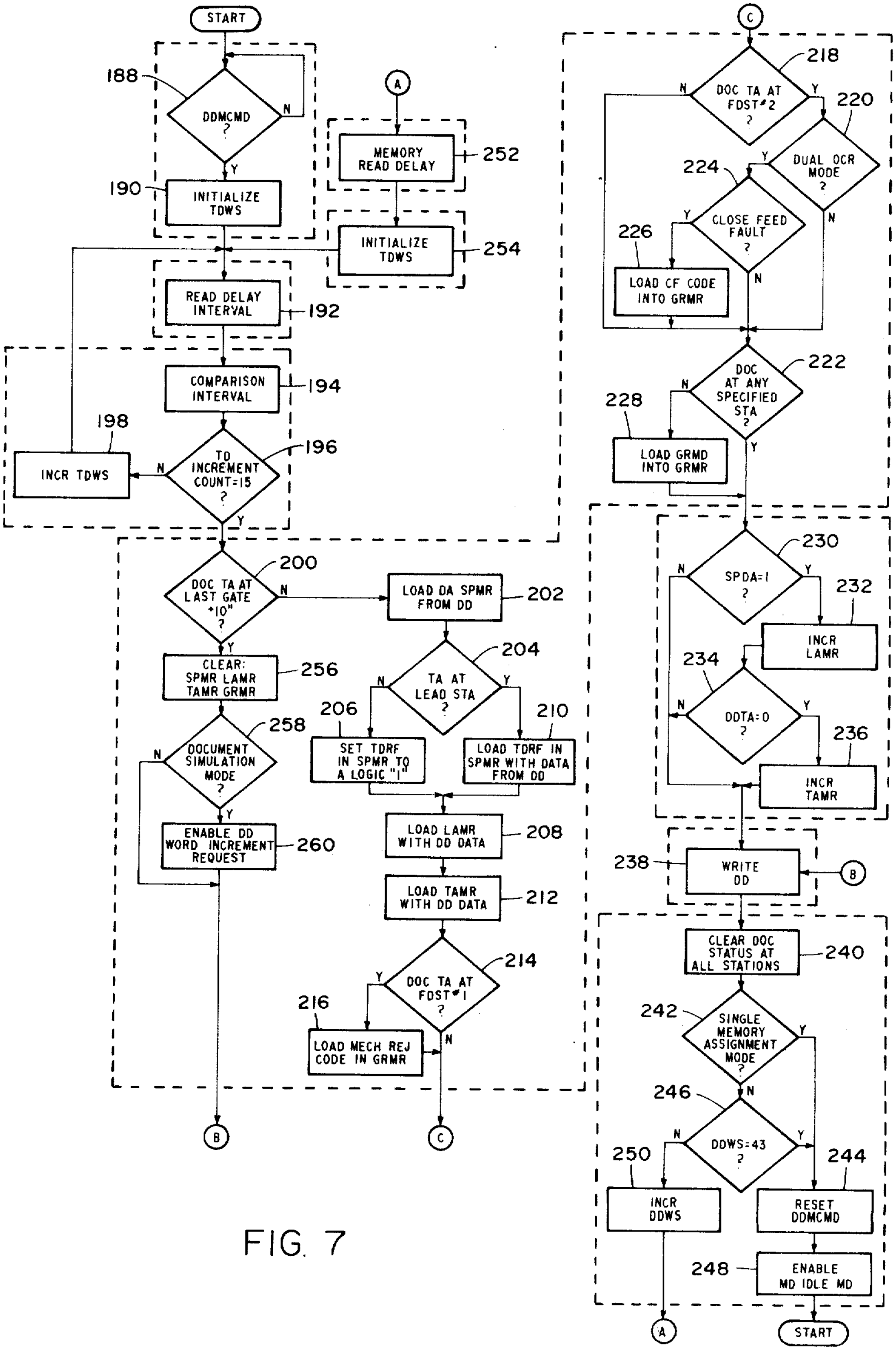
FIG. 7 is a flow chart illustrating a document directory memory comparison mode in accordance with the present invention.

Referring to FIG. 7, there is shown a flow chart of the document directory memory comparison mode wherein the initial inquiry 188 is made immediately following completion of the initial assignment mode step 148. A positive response to the inquiry 188 advances the DDMCMD to an initializing step 190 wherein the transport directory word select register 102 is activated. Following the completion of step 190, the unit processor advances the sequence to a delay interval 192 during which the word read from the transport directory 100 is transmitted to the comparison logic 98 and a delay is initiated to allow the system to reach a steady state condition.

After completion of this delay interval 192, the sequence advances to a comparison step 192 and a comparison is made with the document leading address and trailing address codes as updated in the modifying register logic 82. Following the comparison in step 194, the routine advances to an inquiry 196 to determine if all of the codes in the selected half of the transport directory 100 have been compared. A negative response to the inquiry 196 increments the transport directory word select register 102 in a step 198 and the sequence returns to the delay interval 192.

A positive response to the inquiry 196 indicates that all of the process location codes in the half of the transport in which the document is moving has been considered and the sequence advances to an inquiry 200. Inquiry 200 checks the trailing address code for the particular document being considered to determine if it is ten inches past the last gate. If a document is still within the transport system, a response to the inquiry 200 will be negative and the system will advance to a load step 202.

In the load step 202, the supervisory memory register of the logic 82 is loaded with data from the document directory 80. Following this loading operation, the sequence proceeds to an inquiry 204 to determine whether a document is in the first half or second half of the transport system. With a document in the first part of the transport system, the inquiry 204 produces a positive response and the sequence advances to a step 206 wherein the transport directory reference bit (bit 1) is set to a logic ONE. After setting bit 1 of the supervisory memory register to logic ONE the system advances to a step 208 for loading the leading address memory register with data from the document directory. Assuming the document has passed the first gate station, then a response to the inquiry 204 will be negative and the system will proceed to a step 210 wherein the transport directory reference bit in the supervisory memory is loaded with data from the document directory 80.

To save time in the memory comparison sequence, only one-half of the processing location codes of the transport directory 100 are considered for comparison with any one address of the document directory 80. If the address of the document directory 80 presently being considered indicates by a bit 1 code of the supervisory memory that the document is in the first part of the system, that is, up to the first gate position, then only the first half of the list of Table I will be compared with that particular document data. If the supervisory code at bit 1 indicates the document has passed the first gate, then only the last half of the list of codes in the transport directory 100 are compared with the document code. Thus, for any one document code in the directory 80, only a one-half of the transport directory codes will be compared during one cycle.

Following loading of the leading address memory register in step 208, the sequence advances to a load step 212 wherein the trailing address memory is loaded with data from the document directory. Following loading of the trailing address memory in step 212, the routine proceeds to an inquiry 214 wherein a positive response moves the sequence to a step 216 and a mechanical reject code is loaded into the gate/reject memory register. Following the step 216 or a negative response to the inquiry 214, the sequence proceeds to the inquiry 218 where an inquiry is made to determine if the trailing address of a document is at the second fault station.

The fault stations 1 and 2, as given in Table I, are positions of a document in the transport system at which any mechanical fault of a document are reviewed to determine whether that particular document should be mechanically rejected. The mechanical reject faults will be discussed.

A positive response to the inquiry 218 advances the sequence to a dual mode inquiry 220 to determine whether a particular document is scheduled for dual character recognition at the stations 24 and 26. A negative response to either the inquiries 218 or 220 advances the sequence to an inquiry 222 to determine if the document is at any specified station. The inquiry 222 is also reached by a negative response to a close feed fault inquiry 224 which is made following a positive response to the inquiry 220. If a close feed fault is detected at the second feed station, then the inquiry 224 produces a positive result and the system advances to sequence 226 wherein a close feed fault code is loaded into the gate/reject memory register.

A negative response to the inquiry 220, indicating that a particular document being considered is not at a specified station, produces a negative result and the sequence advances to a load step 28 wherein a gate rejected code is loaded into the gate/reject memory register. Following the step 228 or a positive response to the inquiry 222, the sequence proceeds to an inquiry 230. Inquiry 230 determines whether bit 2 of the supervisory memory register is at logic ONE. A logic ONE indicates that a particular word address has been assigned and the sequence advances to a step 232 wherein the leading address memory is incremented to update the position of a document in the transport system.

Following the step 232, a trailing address inquiry 234 is made to determine if the document directory trailing address is zero, thereby indicating the trailing edge of a document has not passed the item presence detector 16. If the trailing edge of a document has passed the detector 16, inquiry 234 results in a negative response and the system advances to a step 236 and the trailing address memory is incremented to reflect movement of the trailing edge of a document through the transport system.

A negative response to the inquiry 230, indicating that a particular word address in the directory 80 has not been assigned, advanced the sequence to a write step 238 wherein a leading edge code is written into the document directory at the particular address being considered. The sequence also reaches the step 238 by a positive response to the inquiry 234 and completion of incrementing the trailing address memory register in the step 236.

Following completion of the step 238 the sequence advances to a clear step 240 wherein the document leading address and trailing address status at all stations is cleared. The sequence then advances to an inquiry 242 to determine whether this sequence was entered as a result of a single memory assignment mode, that is, should only a single new address be loaded into the document directory. A positive response to the inquiry 242 advances the routine to a reset step 244 to reset the document directory memory comparison mode. The step 244 is also reached by a positive response to an inquiry 246 which is made following a negative response to the inquiry 242. Inquiry 246 is made to determine if all of the address locations in the directory 80 have been considered. Following resetting of the memory comparison mode in the step 244, the sequence advances to a step 248 wherein the tracking logic is enabled into an idle mode.

A negative response to the inquiry 246, indicating that not all of the words in the direction 80 have been considered, advances the sequence to a step 250 wherein the document directory word select register 96 is incremented. Incrementing the document directory word select register 96 advances the sequence to a step 252 initiating a memory read delay before advancing the routine to a step 254 which is an initializing step for the transport directory word select register, as was step 190. Completion of step 254 returns the sequence to the delay interval 192 and the sequence repeats.

A positive response to the inquiry 200, indicating that a document identified at a particular address in the document directory has cleared the last pocket, produced a negative response and the comparison mode advances to a step 256 wherein the modifying register 82 is cleared. The sequence then advances to a step 258 to determine if the memory comparison mode was entered for document simulation. A negative response to the inquiry 258 indicating that this is a normal comparison cycle, advances the sequence to the write step 238. A positive response to the inquiry 258, indicating there is a document simulation test, advances the sequence to a step 260 wherein the document directory word increment request is enabled. The sequence then advances to the step 238.

Figures 8, 9, 11:
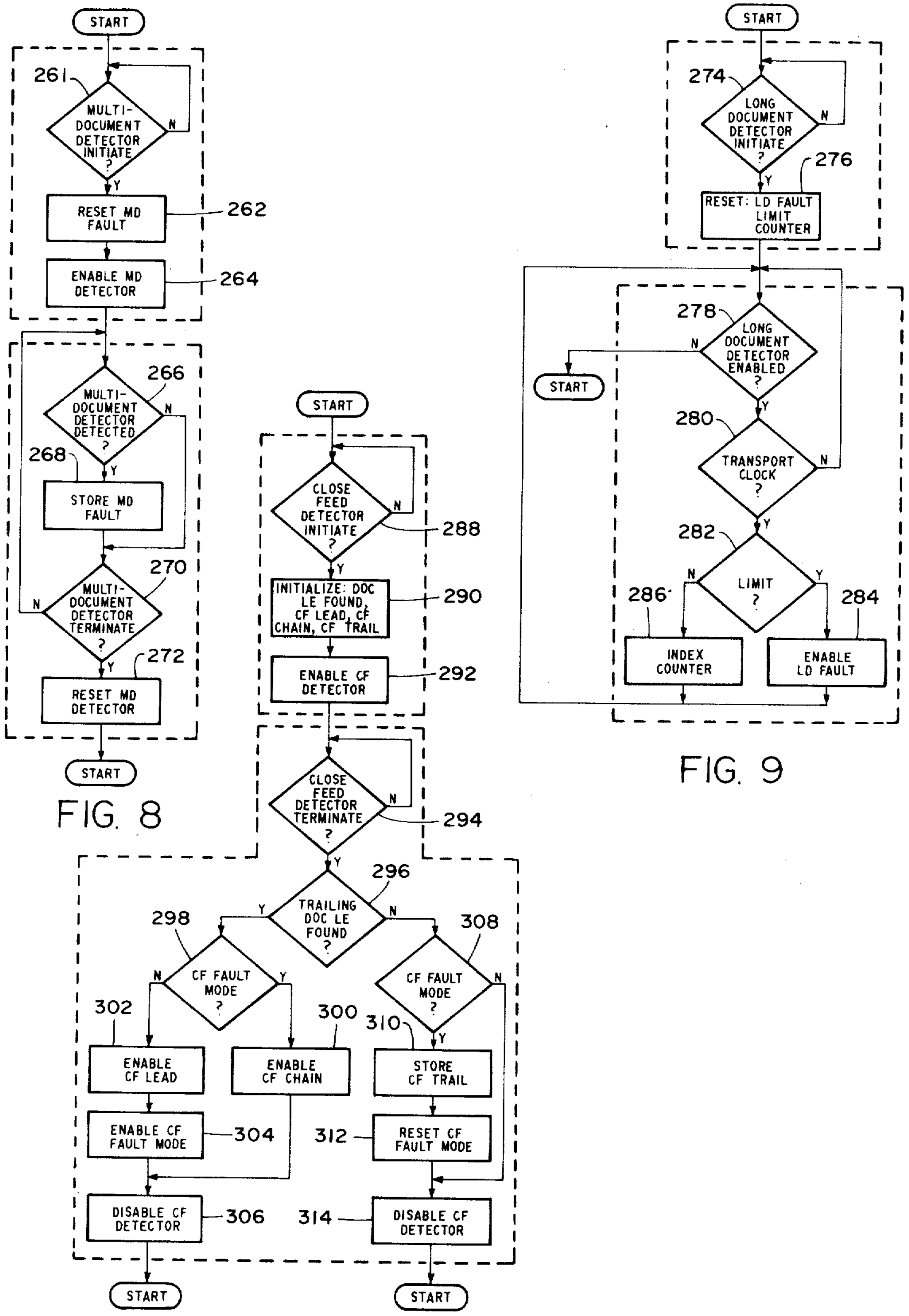
FIG. 8 is a flow chart illustrating the multi-document detector subroutine of the tracking logic.
FIG. 9 is a flow chart illustrating the long document detector subroutine of the tracking logic.
FIG. 11 is a flow chart illustrating the operation of the tracking logic in a close feed document detection mode.

As a document passes a fault detection station 1 (FDST No. 1) a point 3.8 inches downstream of the item presence detector 16, multi-document detection logic is enabled by the unit processor to look for a signal from the multi-document detector 22. If a fault occurs, an indication is stored in the document directory 80 at the word address associated with the document in question when the trailing edge thereof is detected at the fault detection Station No. 1. Referring to FIG. 8, there is shown a flow chart of the multi-document detection routine which is initiated when a document is 3.8 inches into the system from the item presence detector 16. This routine is initiated by an inquiry 261 wherein a positive result advances the sequence to reset step 262. The reset step 262 resets multi-document detection logic and advances the sequence to an enable step 264. The enable step 264 conditions the multi-document detection logic to receive data on the document of interest. The sequence then advances to an inquiry 266 to determine if the multi-document 22 has detected multiple documents simultaneously moving through the transport system at a given point. A positive response to the inquiry 266, indicating that multiple documents are moving through the system, advances the sequence to a store step 268 wherein a multi-document fault code (MDFLT) is stored in the modifying register logic 82. Completing the step 268 advances the multi-document detector sequence to an inquiry 270 wherein a negative response indicates that the fault document detector is still active and the system returns to inquiry 266. A positive response to the inquiry 270 indicates that the sequence has been completed and advances to a step 272 wherein the multi-document detector 22 is reset and the routine is complete.

Also within the fault detection capabilities of the present system, as a document passes the fault detection station No. 1, a long documented detector will be enabled. This detector determines the distance between the leading edge and the trailing edge of a single document or overlapped documents. If the distance exceeds an allowable length (which is determined by the document length mode) a long document fault (LDFLT) will be declared. If a fault occurs an indication will be stored in the document directory 80 at the word address associated with the document being considered when the trailing edge of the document is detected at the fault detection station No. 1. The long document detection determines the length of a document by the time elapsed between the sensing of the leading edge of a document and the occurrence of the first trailing edge signal.

Referring to FIG. 9, there is shown a flow chart of the long document detector sequence wherein the routine is initiated by an inquiry 274 by an instruction from the unit processor. A positive response to the inquiry 274 advances the sequence to a reset step 276 wherein the long document logic is reset to accept data on a new document. Next, the sequence proceeds to an inquiry 278 which produces a positive response if the long document detector has been enabled. Following the inquiry 278 the long document routine advances to a transport clock inquiry 280 to determine if it has been enabled to time the distance between the leading edge transition and the first trailing edge transition.

With the transport clock operation, the sequence advances to a limit inquiry 282 to determine if the time between the leading edge transition and the first trailing edge transition exceeds a limit for establishing the length of documents to be accepted by the system. If the limit has been exceeded, the sequence advances to an enable step 284 wherein a long document fault (LDFLT) code is transmitted to the modifying register logic 82 through the selection logic 86.

A negative response to the limit inquiry 282 indicates that the document falls within the prescribed length and the sequence advances to an index step 286. Completing both the steps 284 and 286 returns the sequence to the enable inquiry 278. The inquiry 278 will result in a negative response thereby returning the sequence to the start condition until the next leading edge transition is at the first fault detection station.

Still another mechanical fault detection sequence of the present invention is to determine a close feed between subsequent documents. The close feed sequence is enabled when a trailing edge of a document is initially stored in the document directory 80. When only one of the character reader stations 24 or 26 is to be utilized, the close feed detector will be disenabled at the fault detection station No. 1. This provides for a close feed criterion of 3.0 inches minimum to 3.2 inches maximum. When two character reader stations are to be utilized, the close feed detector is disabled at the fault detection station No. 2, a point located 11.8 inches from the item presence detector 16. This provides a close feed criterion of 11 inches minimum and 11.2 inches maximum. It should be understood, that the reference to the above lengths is by way of example only as the fault detection stations No. 1 and No. 2 may be located at other points along the transport system from the item presence detector 16.

Figure 10:
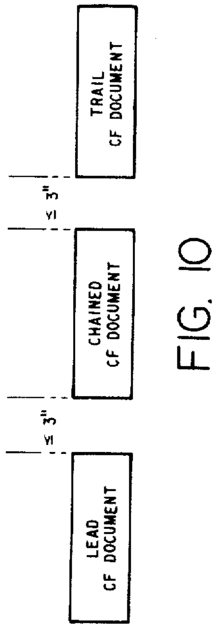
FIG. 10 illustrates document close feed fault conditions.

If a close feed fault condition occurs when only one of the character reader stations is to be utilized, the fault indication will be stored at the address of the document directory 80 associated with the document when the trailing edge is detected at the fault detection station No. 1. This is at the same time that a long or multi-document fault would be stored. When two character reader stations are employed, a close feed fault will be stored when the trailing edge of the document is at the fault detection station No. 2. There are three types of close feed faults; they are: a lead fault, a chain fault, and a trail close feed fault. An illustration of these faults is presented in FIG. 10.

Referring to FIG. 11, there is shown a flow chart of the close feed detector routine initiated by an inquiry 288. Following the inquiry 288, the sequence advances to a step 290 to initialize logic to determine if the leading edge of a trailing document has been detected and also to enable logic for the close feed lead, close feed chain and close feed trail faults. After the initializing step 290, the sequence proceeds to an enable step 292 wherein the close feed detector logic is enabled. The routine then advances to an inquiry 294 and a positive result advances the sequence to an inquiry 296 to determine if the leading edge of the trailing document has been detected. A positive response to the inquiry 296 advances the sequence to a CF fault inquiry 298 where a positive answer advances the routine to a step 300 to enable close feed chain logic and generate the close feed chain fault (CFCFLT) code to the modifying register logic 82.

If the end result of the inquiry 298 is negative, the sequence advances to an enable step 302 to enable close feed lead fault logic to generate a close feed lead fault (CFLFLT) signal to the modifying register 82. Following the step 302, the sequence advances to an enable step 304 wherein the close feed fault mode is enabled. Completing either the steps 300 or 304 advances the routine to a disable step 306 to disable the close feed detector logic.

Returning to the inquiry 296, a negative response advances the sequence to CF fault inquiry 308 wherein a determination is made if the sequence is a close feed fault mode. A positive response to the inquiry 308 advances the routine to storing step 310 where the close feed trail fault (CFTFLT) code is stored in the modifying register 82. Following the step 310, the sequence advances to a reset step 312 which resets the close feed fault mode. The system is then advanced to step 314 to disable the close feed detector logic.

Storing of any of the fault signals in the gate/reject modifying register of the modifying logic 82 indicates that the document contains a mechanical fault requiring it to be rejected into a rejection stacker pocket. This mechanical fault code is carried with the leading edge code and the trailing edge code at each comparison step until the first stacker actuating point is reached by the document. At that point, a comparison of the process location code with the leading edge and trailing edge code from the document directory 82, along with instructions from the unit processor, activates the first pocket gate to divert any mechanically rejected documents into the first stacker pocket.

An advantage of the present document tracking system is the ability to simulate the movement of a document through the transport to check operation of the system. A document is simulated as passing the item presence detector 16 and the leading and trailing edge codes of the simulated document are updated for each increment of travel through the transport system, the same as an actual document. The simulated document leading and trailing edge codes are compared with the processing location codes from the transport directory in the manner as explained. Programmed into the simulation mode and stored in the gate/mechanical reject register is a code representing any one of the stacker gates.

Whenever a comparison occurs for this simulated document in the document directory memory comparison mode, as given in FIG. 7, at the station location selected, that stacker gate operates as if an actual document was moving through the system. By this technique, the system may be checked without actually inserting documents through the transport.

Figure 12:
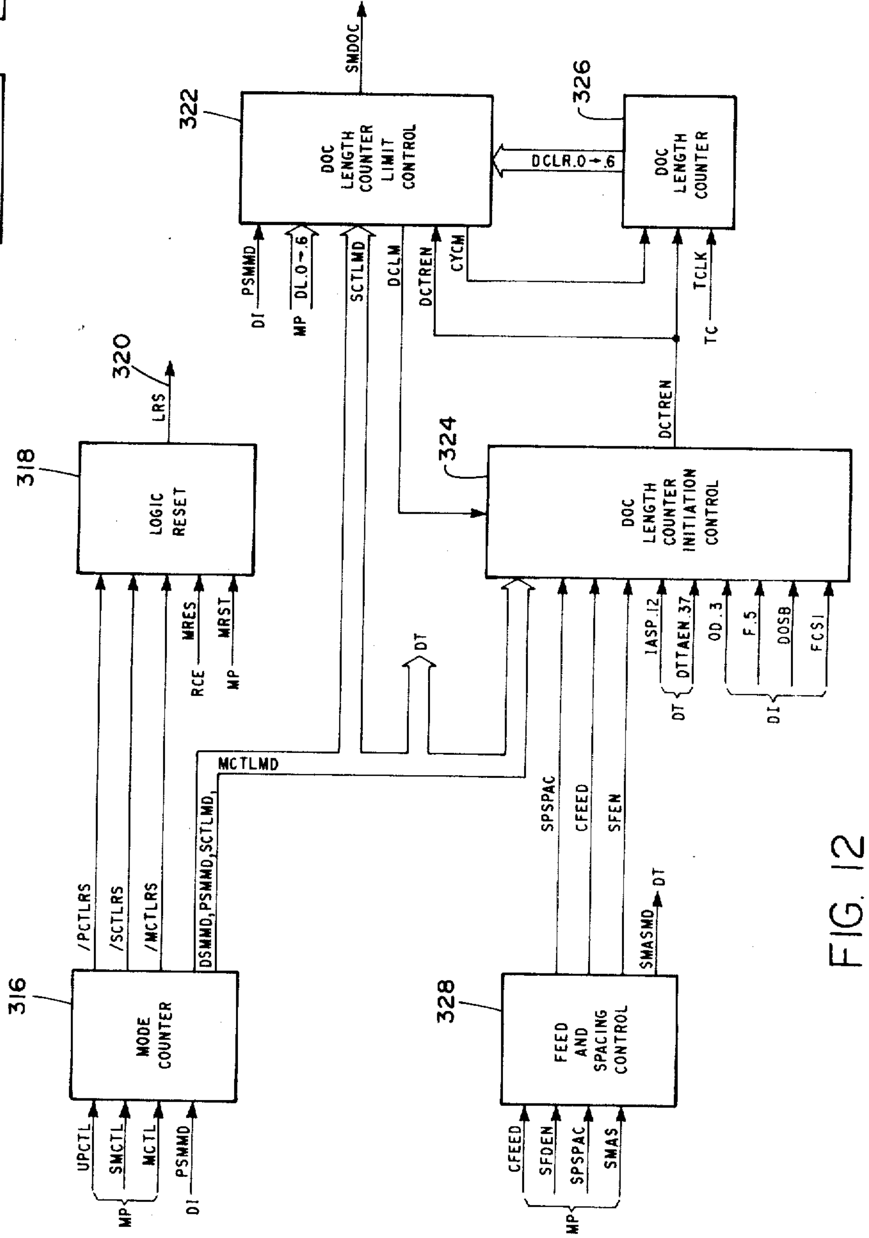
FIG. 12 is a block diagram of logic for simulating a document in the transport system.

Referring to FIG. 12, there is shown a block diagram of document simulation logic for use with the document tracking logic of FIG. 3. As explained, the function of the document simulation logic is to simulate documents for use as inputs to the document tracking logic. There are three operational modes that can be selected: a unit processor control mode (UPCTL), a simulator control mode (SMCTL), and a maintenance control mode (MCTL) as established in a mode controller 316. The mode control logic 316 generates instructions to a logic reset network 318 to generate a logic reset signal on a line 320 to be utilized throughout the simulation mode. Also generated by the mode control logic 316 are a series of word codes to be utilized in the simulation. This data is transmitted to the document tracking logic (DT) and in addition to limit control logic 322 and counter initiation control logic 324. The logic 324 addresses a document length counter 326 to generate data bits to the limit control logic 322. Also included as part of the document simulation logic is a feed and spacing control network 328 generating instructions to the document tracking logic and the initiation control logic 324.

The unit processor mode of the simulator logic allows the transport electronics (FIG. 2) to be under control of the unit processor. The unit processor places the transport electronics in a diagnostic mode called processor simulation mode (PSMMD). In this mode, documents of a selected length are simulated continuously but with the spacing such that only one document is in the transport at a time. When the simulation logic is in the maintenance control mode, it provides for use of the transport without the use of the unit processor. Documents can be endorsed, or microfilmed, or stacked in any selected pocket, or alternated between any pocket and the last pocket.

While only one embodiment of the invention, together with modifications thereof, has been described in detail herein and shown in the accompanying drawings, it will be evident that various further modifications are possible without departing from the scope of the invention.

What is claimed is:

1. A method of sequentially routing the movement of an article in a distribution system for delivery to one of a plurality of channels each having a known time displacement along the distribution system, comprising the steps of:

generating for each article entering the system an initial position code representing the starting of the article into the system, storing the initial position code for each article at an address of a read/write memory, generating clock pulses synchronized with the movement of an article in the distribution system, incrementing the initial position code in response to the clock pulses to reflect movement of the article in the distribution system, storing the incremented position code at the address location of the previously stored position code for a selected article, storing in memory an identifying code for each of the plurality of channels at an address corresponding to the displacement of each channel in the system and sequentially comparing each position code with all of the identifying codes and in response to a predetermined relation produced upon such comparison controlling one of the plurality of system channels.

2. The method as set forth in claim 1 including the step of generating for each article a trailing code representing the complete entry of the article at the address in the read/write memory of the position code.

3. The method as set forth in claim 2 including the step of incrementing each of the trailing codes at the time intervals for incrementing the position codes to reflect the time displacement of the article in said system.

4. The method as set forth in claim 1 wherein the comparison step is made for each incrementing of the position code.

5. The method as set forth in claim 1 including the steps of generating a system location code to identify a section of the system, and storing the location code in the read/write memory at the address of the position code for each article, the system location code identifying a particular section of the total system through which the article is moving.

6. The method as set forth in claim 5 wherein the sequential comparison between the position code and the identifying code is restricted to the identifying codes within the system identified by the location code.

7. The method as set forth in claim 1 including the step of generating a reject code for an article having a predetermined characteristic, the reject code to be stored at the address of the position code in the read/write memory.

8. The method as set forth in claim 7 including the step of rejecting the article having a reject code stored therefor when a comparison of the position code and the identifying code produces the predetermined relation at a reject channel of the system.

9. The method as set forth in claim 1 including the step of generating a channel selection code for each article, and storing the channel selection at the address of the position code for the respective article in the read/write memory.

10. The method as set forth in claim 9 including the step of actuating channel control means as identified by the channel selection code when a predetermined relation is produced by a comparison of a position code and the identifying code for the article item associated with the channel selection code.

11. A method of routing a document through a transport system for delivery to one of a plurality of processing stations with a known time displacement therebetween, comprising the steps of:

generating for each document passing an item presence detection station a signal representative of the leading and trailing edges of the document, storing signals representative of the processing stations displaced along the transport system, generating clock pulses synchronized with the movement of the document in the transport system, incrementing said edge signal in response to the clock pulses to reflect movement of the document in the transport system, and comparing the incremented edge signals with the stored signals and in response to a predetermined relation produced upon such comparison, actuating a processing station to process the document then at said station.

12. The method as set forth in claim 11 including the step of storing the signals representative of a leading and trailing edge of a document at an address of a read/write memory.

13. The method as set forth in claim 12 including the steps of generating a document reject signal for each document having a length in excess of a preselected dimension, and storing the reject signal at the address of the leading and trailing edge signals in the read/write memory.

14. The method as set forth in claim 12 including the steps of generating a document reject signal for each document passing through the transport system in multiples, and storing the reject signal at the address of the leading and trailing edge signals in the read/write memory for each such multiple document.

15. The method as set forth in claim 12 including the steps of generating a reject signal for each document in the transport system having a proximity to another document in the system less than an established minimum, storing the reject signal at the address of the leading and trailing edge signals in the read/write memory for each such close feed document.

16. The method as set forth in claim 11 including the step of generating a system location signal to identify a section of the total transport system for each document to be stored in the read/write memory at the address of the leading and trailing edge signals, the system location signal identifying a particular section of the transport system through which the document is presently moving.

17. The method as set forth in claim 16 wherein the comparing of the incremented edge signals with the stored signals is restricted to the stored signals within the system identified by the system location signal.

18. A method of simulating document movement through a transport system having a plurality of processing stations with a known time displacement therebetween, comprising the steps of:

simulating a leading edge signal and a trailing edge signal to represent the passing of a document through an item presence detector, storing fixed signals representative of the locations of processing stations along the path of the transport system, incrementing the simulated edge signals in synchronism with movement of the transport system to reflect movement of the simulated document therein, and comparing the incremented simulated edge signals with the fixed signals and in response to a predetermined relationship between the fixed signals and the simulated edge signals actuating a processing station identified by the fixed signal in the comparison.

19. Apparatus for routing an article through a distribution system for delivery to one of a plurality of channels with a known time displacement therebetween, comprising in combination:

means for detecting the presence of an article entering the system and generating an entry signal therefor, a read/write memory having address locations at least equal in number to the number of articles in the system at any given time, means responsive to the entry signal for writing an article position code into an address of said read/write memory, means for generating clock pulses at time intervals synchronized with the movement of an article in the distribution system, means for incrementing the article position code in response to the clock pulses to reflect movement of the article in the distribution system, a position memory having stored therein a channel position code for each channel of said system in an order related to the time displacement of each channel, and means for sequentially comparing an article position code with all of the channel position codes and in response to a predetermined relation controlling one of the plurality of system channels.

20. Apparatus as set forth in claim 19 wherein said means for incrementing includes means for reading an article position code from the read/write memory into a modifying register at a preselected time interval, and means for incrementing the position code in the modifying register at selected time intervals to reflect the time displacement of the control item in said system.

21. Apparatus as set forth in claim 19 wherein said means for detecting the presence of an article also generates a trailing signal and the means responsive to the entry signal also responds to the trailing signal for writing an article trailing code into the address of said read/write memory as the position code for a particular article.

22. Apparatus as set forth in claim 19 including means for generating a system location code to identify a section of the total system for each article to be stored in the read/write memory at the address of the article code, the system location code identifying a particular section of the total system through which the article is moving.

23. Apparatus as set forth in claim 22 wherein said means for sequentially comparing an article presence code with all of the channel position codes including means for restricting the comparision to channel position codes with the system as identified by the system location code.

24. Apparatus as set forth in claim 19 including means responsive to the predetermined relationship of an article position code with the channel position code for decoding the channel position code to generate a control signal for one of the plurality of system channels.

25. Apparatus for routing a document through a transport system for delivery to one of a plurality of processing stations with a known time displacement therebetween, comprising in combination:

means for generating a leading edge signal and a trailing edge signal as a document passes a document presence detector, means for storing fixed signals representative of the location of the processing stations along the transport path, means for incrementing said edge signals in synchronism with the movement of the transport system to reflect the displacement of a document from the document presence detector, and means for comparing the incremented edge signals with the fixed signals and in response to a predetermined relation between a fixed signal and an edge signal actuating a processing station identified by the compared fixed signal.

26. Apparatus as set forth in claim 25 including means for tracking the document as it enters the transport system and for generating mechanical reject signals to be stored with the incremented edge signals for each document not satisfying a particular mechanical configuration.

27. Apparatus as set forth in claim 26 including means for storing the incremented edge signals between each comparison thereof.

28. Apparatus as set forth in claim 27 wherein said means for storing includes a read/write memory.

29. Apparatus as set forth in claim 28 wherein the fixed signals are stored in a read only memory.

30. Apparatus as set forth in claim 28 including a temporary storage register for receiving the edge signals from the read/write memory, and means for incrementing the edge signals in said temporary storage register.

* * * * *

PO-1050
(5/69)

UNITED STATES PATENT OFFICE
CERTIFICATE OF CORRECTION

Patent No. 3,815,102 Dated June 4, 1974

Inventor(s) Joseph A. Plunkett

It is certified that error appears in the above-identified patent and that said Letters Patent are hereby corrected as shown below:

Abstract, line 12, delete "and" and add --as--;
Col. 1, line 14, delete the sentence beginning with "With either of these..." and substitute --Whenever the length of the transport was changed or optical devices such as recording cameras were added along the transport pat of either of these tracking techniques, changes had to be incorporated into the wiring and the number of components employed.--;
line 42, delete the sentence beginning with "For example, boxes..." and substitute --For example, if all points along the belt system have a known displacement versus time relationship, boxes on a conveyor belt may be tracked to the various unloading stations.--;
line 63, after "identifying code" add --,--;
line 64, after "memory" delete ",";
line 66, after "code" add --,--.
Col. 2, line 10, after "function" delete ",";
line 10, delete "if" and add --as--;
line 25, after "codes" add --,--;
line 26, after "comparison" delete ",".
Col. 3, line 30, "in" (second occurrence) should be --is--;
line 32, "and" should be --are--;
line 55, after "accordance" insert --with instructions from a series of output control registers--.
Col. 4, line 25, "control" should be --controls--;
line 27, "rear" should be --read--;
line 46, after "completed" add --,--;
line 54, after "line 66" add --,--;
line 54, after "and" add --receiving--;
line 57, after "64" delete "is" and add --are--;
line 59, before "simulated" insert --the--.
Col. 5, line 1, "of" should be --or--;
line 64, cancel "timed" and insert --time--.
Col. 6, line 14, delete "as";
line 44, delete "and";
line 44, delete "are";

PO-1050
(5/69)

UNITED STATES PATENT OFFICE
CERTIFICATE OF CORRECTION

Patent No. 3,815,102 Dated June 4, 1974

Inventor(s) Joseph A. Plunkett

It is certified that error appears in the above-identified patent and that said Letters Patent are hereby corrected as shown below:

Col. 6, line 45, after "mnemonic" delete "in";
line 45, "CTCD.0-4" should be --GTCD.0-4--;
line 49, cancel "(DDSD.0-2)" and substitute --(DDSP.0-2)--.
Col. 7, line 12, delete "To address" and substitute --The addressing of--;
line 26, "sequential" should be --sequentially--;
line 26, "modified" should be --modifying--;
line 41, before "read only memory" insert --a--;
line 41, after "memory" add --,--;
line 42, "in" should be --is--;
line 43, after "words" insert --,--;
line 44, cancel "significat" and substitute --significant--
line 65, cancel "OCT" and substitute --OCR--.
Col. 8, line 62, "detected" should be --decoded--.
Col. 9, line 1, "(SSMC)" should be --DDMC--.
Col. 10, line 44, after "data" add --,--;
line 50, "rite" should be --write--;
line 67, after "reset" add --,--.
Col. 11, line 41, "selector" should be --select--;
line 45, "complementing" should be --completing--.
Col. 12, line 32, "192" should be --194--;
line 59, delete "positive" and substitute --negative--;
lines 67 and 68, delete "negative" and substitute --positive--.
Col. 13, line 18, after "only" delete "a";
line 54, delete "220" and substitute --222--;
line 57, "28" should be --228--.
Col. 14, line 5, delete "236 and the" and add --238.--;
lines 5-8, delete this material;
line 11, before "write" cancel "a";
line 11, "advanced" should be --advances--;
line 17, after "step 236" and before the period add --to reflect movement of the trailing edge of a document through the transport system--;
line 18, after "step 238" add --,--;
line 37, "direction" should be --directory--;
line 51, "duced" should be --duces--.

PO-1050
(5/69)

UNITED STATES PATENT OFFICE
CERTIFICATE OF CORRECTION

Patent No. 3,815,102 Dated June 4, 1974

Inventor(s) Joseph A. Plunkett

It is certified that error appears in the above-identified patent and that said Letters Patent are hereby corrected as shown below:

Col. 15, line 14, after "multi-document" insert --detector--;
line 39, after "occurs" add --,--;
line 57, after "278" add --,--.
Col. 17, line 22, delete "82" and insert --80--;
line 30, after "detector 16" add --,--;
line 62, after "(DT)" add --,--;
line 62, before "limit" insert --the--;
line 63, before "counter" add --the--.
Col. 18, line 64, "system" should be --systems--.
Col. 19, line 26, cancel "item";
line 39, "signal" should be --signals--.
Col. 21, line 19, "including" should be --includes--.

Signed and sealed this 17th day of September 1974.

(SEAL)
Attest:

McCOY M. GIBSON JR.
Attesting Officer

C. MARSHALL DANN
Commissioner of Patents